United States Patent
Klaue

[15] 3,674,118
[45] July 4, 1972

[54] FULL DISC BRAKE WITH ROTATING BRAKE DISCS

[72] Inventor: Hermann Klaue, Tour D'Ivoire 24e,, Montreaux, Switzerland

[22] Filed: Aug. 1, 1969

[21] Appl. No.: 846,703

[30] Foreign Application Priority Data

March 27, 1969 Germany..................P 19 15 651.5

[52] U.S. Cl..........................188/72.2, 188/72.6, 188/72.8, 192/54, 192/70.23
[51] Int. Cl........................................................F16d 55/48
[58] Field of Search.....................188/72.2, 72.4, 72.6, 72.7, 188/72.8; 192/54, 70.23

[56] References Cited

UNITED STATES PATENTS

| 2,109,722 | 3/1938 | Fawick | 188/72.2 |
| 2,344,933 | 3/1944 | Lambert | 188/72.2 |
| 2,786,560 | 3/1957 | Ishoy | 188/72.2 |
| 2,938,607 | 5/1960 | Kershner et al. | 188/72.8 |

*Primary Examiner*—George E. A. Halvosa
*Attorney*—Larson, Taylor and Hinds

[57] ABSTRACT

A disc brake having a plurality of braking discs which engage each other to brake a rotatable member. An actuating disc at one end of the brake cooperates with raised surfaces and rolling elements such that upon limited rotational movement of the actuating disc the brake discs are urged together to effect the braking. A fluid or manually operable piston engages a lateral surface of the actuating disc to cause the said limited relative rotation thereof to effect braking.

10 Claims, 4 Drawing Figures

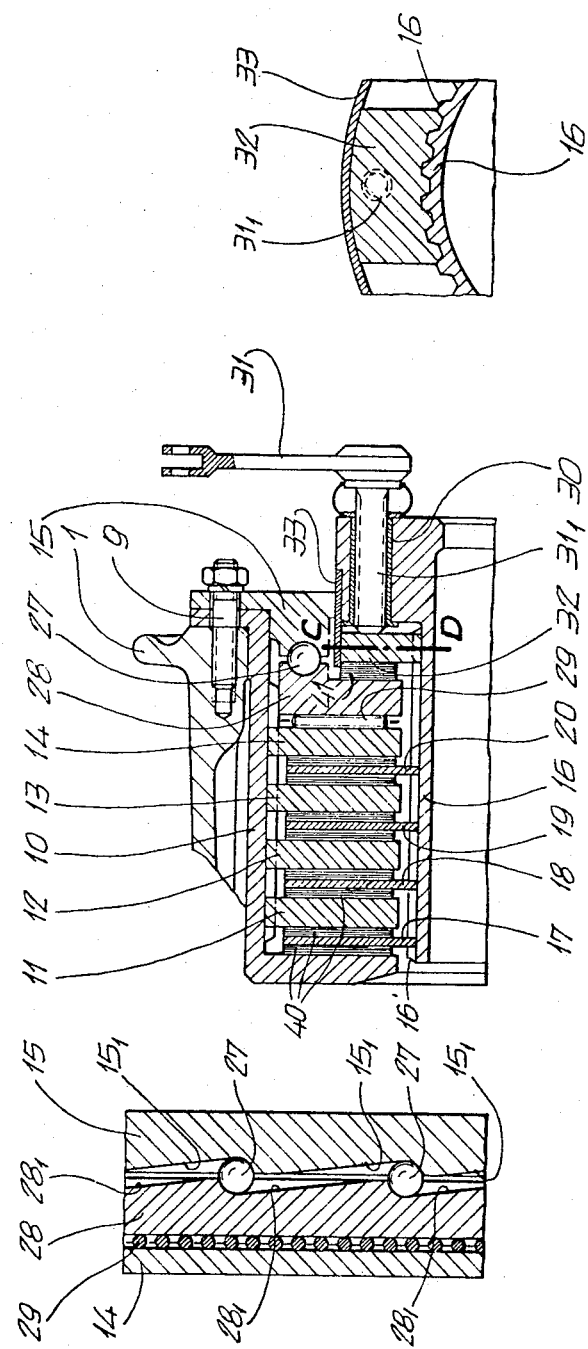

FULL DISC BRAKE WITH ROTATING BRAKE DISCS

BACKGROUND OF THE INVENTION

This invention relates to disc brakes, and in particular it relates to disc brakes of the type having an actuating disc which, by limited rotational movement relative to the other discs, causes the main brake discs to be urged together to effect braking.

In my previous application, Ser. No. 831,305 filed on June 9, 1969, and now abandoned, there is disclosed an arrangement including a fully lined disc brake including an actuating disc normally rotatable with the brake discs but capable of limited rotational movement relative to the brake discs to cause frictional engagement of the rotatable brake discs with fixed surfaces to effect braking of a rotatable member.

Specifically, in my said previous arrangement, a friction member engages the cylindrical outer periphery of the actuating disc to cause said limited rotational movement. The side surfaces of the actuating disc cooperate with raised surfaces and rolling means to effect separation of the brake discs from the actuating disc during the said limited rotation of the latter to effect braking. This type of brake has the advantage that the force necessary to effect braking is much less than that required with a conventional brake design.

However, the above described arrangement of my previous patent cannot be applied in certain applications where the braking action must be effected from the side (that is in an axial direction) rather than against the outer periphery of the actuating disc. Also, certain types of brakes do not require the capacity to remove heat which is possible with my previous arrangement. As an example, brakes of airplane wheels must absorb much energy in a short period of time, or example about 20 seconds, which period is so short that the heat developed during braking cannot be dissipated but must be stored. Also, in view of the large and immediate requirements of an airplane brake, a much larger lining surface must be available in order to keep the specific load per unit surface down to an acceptable level so that the service life of the brake linings will be of sufficient length. Similar requirements apply to brakes situated in traction wheels of track-type vehicles.

SUMMARY OF THE INVENTION

Thus, it is a purpose of this invention to provide a new and improved disc brake having an actuating disc which is engaged laterally rather than at its outer peripheral surface.

This purpose of the present invention is achieved by providing an arrangement wherein the limited annular space within the wheel of the vehicle may be completely filled with the usual brake discs, wherein certain discs are non-rotatable and the alternate discs are rotatable with the wheel. The means for effecting actuation of the brake is then provided at the end thereof. In accordance with a feature of the present invention, this actuating means comprises an actuating disc which, on one side acts through bearing means to urge the discs together to effect braking. This actuating disc collaborates with an adjacent member through raised surfaces and rolling means located between the actuating disc and the adjacent member such that by limited rotational movement of the actuating disc, the latter moves axially away from its said adjacent member thereby urging the discs together to effect braking. A piston means engages a side surface of the actuating disc to limit rotational movement of the same relative to the other discs to effect braking. This last said piston can be operated by any suitable means such as fluid pressure or by manual operation.

Thus, it is a purpose of this invention to provide a new and improved disc brake.

It is another purpose of this invention to provide a new and improved disc brake of the type having an actuating disc, the rotational movement of which is limited by means engaging its lateral surface whereby braking is effected.

It is another object of this invention to provide a new and improved disc brake which is particularly advantageous in prompt and high intensity braking operations.

Other objects and the attendant advantages of the present invention will become apparent from the detailed description to follow together with the accompanying drawings.

BRIEF DESCRIPTION OF THE DRAWINGS

There follows a detailed description to be read together with the accompanying drawings, the description and the drawings being provided only to illustrate a preferred embodiment of the invention.

FIG. 2 is a partial development view taken through a cylinder about the axis of the brake and passing through line A-B of FIG. 1.

FIG. 3 is a partial axial sectional view similar to FIG. 1 but showing a modification of the invention.

FIG. 4 is a partial sectional view taken along lines C-D of FIG. 3.

DETAILED DESCRIPTION OF THE PREFERRED EMBODIMENTS

Figure 1:
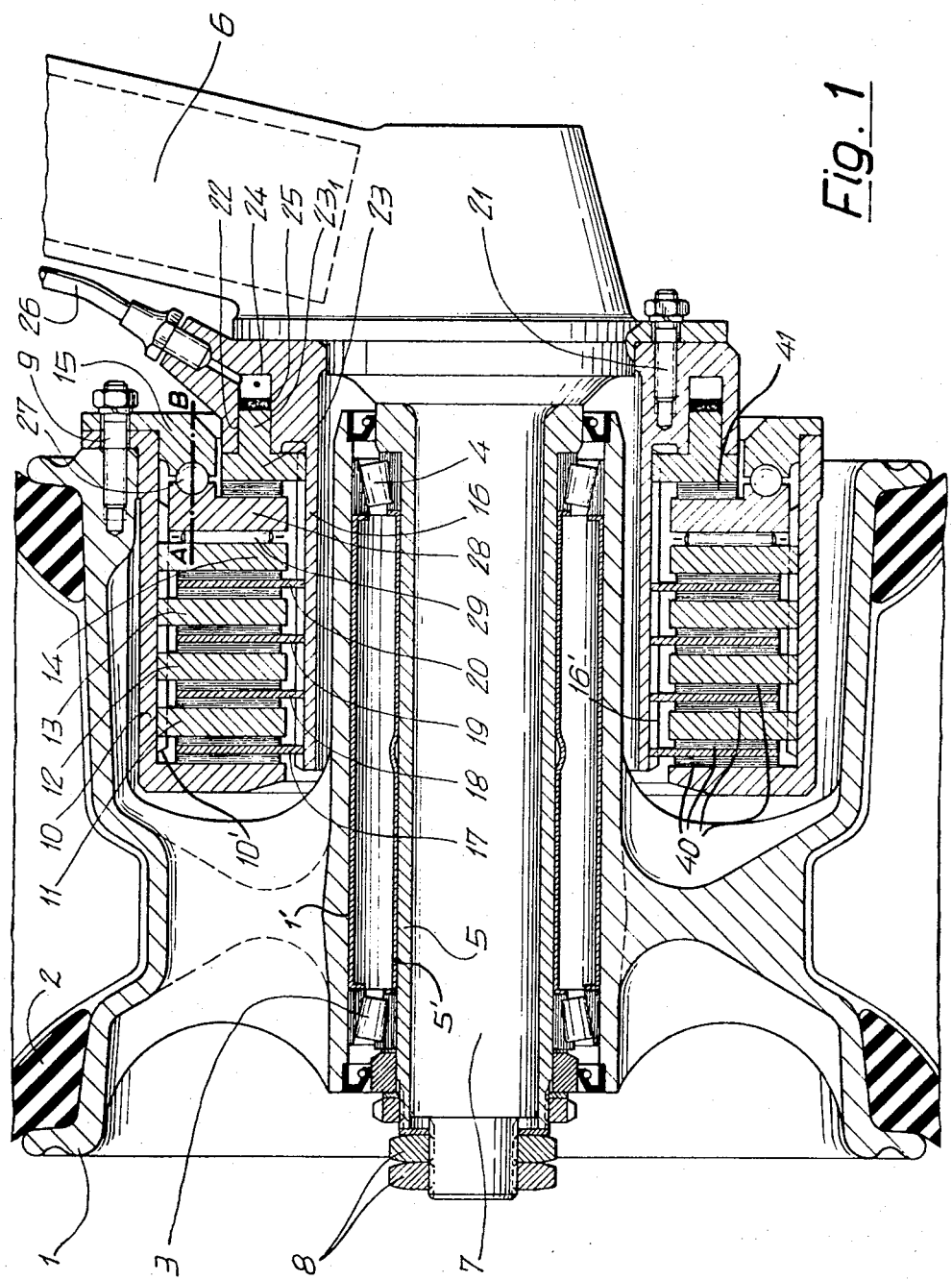
FIG. 1 is an axial sectional view through an airplane wheel having mounted therein a disc brake assembly incorporating the features of the present invention.

Like numerals are used to represent like elements throughout the several views.

Referring now to FIGS. 1 and 2, a wheel rim 1 has a tire 2 mounted thereon. The wheel 1 is supported by means of tapered roller bearings 3 and 4 for rotational movement about a wheel support tube 5. Sleeves 1' and 5' engage elements 1 and 5 respectively and include flanges at their ends for positioning the bearings 3 and 4. The support tube 5 is held on a shaft 7 by means of nuts 8 which threadedly engage the free end of shaft 7. The other end of this shaft is integral with the vehicle suspension unit 6.

Bolts 9 connect to the wheel rim 1 the outer brake bracket of the disc brake constructed in accordance with the features of the present invention. This outer bracket includes axially extending splines 10' on which outer brake discs 11, 12, 13 and 14 are mounted for rotational movement with the outer bracket 10, and hence the wheel 1 and for axial movement along these splines 10'.

An end plate 15 is also held by means of bolts 9 to the rim 1 and the outer bracket 10 for rotation therewith.

An inner brake bracket 16 is connected to the suspension 6 by means of bolts 21 and includes axially extending splines 16' on which inner brake discs 17, 18, 19 and 20 are mounted non-rotatably with the inner bracket 16 but for axial movement along the splines 16'. The splines 16' are visible in cross-section in FIG. 4.

Suitable friction lining members 40 are provided between the brake discs 11–14 and 17–20. These linings may be mounted on either the inner or the outer brake discs.

For actuating the brake, the present invention includes an actuating disc 28 separated from the first adjacent brake disc, which happens to be the outer brake disc 14, by means of rolling elements 29. On the opposite side, this actuating disc has raised surfaces $28_1$ (see FIG. 2) which mate with raised surfaces $15_1$ on the in plate 15 which is adjacent to the actuating disc 28. Rolling elements such as balls 27 are provided between the elements 28 and 15. Referring to FIG. 2, it can be seen that upon relative movement of the element 28 relative to the element 15, the element 28 will move to the left (FIG. 2) relative to the element 15. This will exert a force to the left in FIG. 1 thereby urging brake discs together to effect braking of the wheel. In accordance with the feature of the present invention, the relative movement between the elements 28 and 15 is brought about by simply engaging the element 28 by frictional means or the like to limit rotation thereof relative to the element 15; and this will cause the necessary separation between these two elements to effect braking. Consequently, the relatively small force required to limit rotation of element 28 is all that is necessary to effect braking.

In the embodiment of FIG. 1, this action upon the actuating disc 28 is brought about by means of actuating piston 23 which includes a rightwardly extending portion $23_1$ which is received in a recess 22, the inner end of which forms a chamber 24 separated from the element 23 by means of packing 25. Thus, by introducing fluid under pressure through line 26 to the chamber 24, the element 23 is moved to the left (FIG. 1) thereby applying a frictional force to the actuating disc 28 through friction lining 41. Consequently, the rotational movement of element 28 is limited and braking is effected in the manner described above. Preferably the elements 22–25 will be annular in shape extending about the axis of the wheel. Preferably the fluid will be hydraulic fluid although pneumatic fluid is also applicable.

In the embodiment of FIGS. 3 and 4, the pressure fluid actuating means is replaced by a mechanical actuating means. In this case a threaded sleeve 30 is pushed through an aperture in the inner bracket 16 and a threaded extension $31_1$ of an actuating lever 31 is screwed into this sleeve. The left-hand end of extension 31 (FIG. 3) engages an actuating piston 32 such that by turning the lever 31 the extension $31_1$ moves the piston 32 to the left to effect braking in the same manner described above with respect to the element 23 in the embodiment of FIG. 1. A guide ring 33 supports and guides the piston 32.

Although the invention has been described in considerable detail with respect to a preferred embodiment thereof, it will be apparent that the invention is capable of numerous modifications and variations apparent to those skilled in the art without departing from the spirit end scope of the invention.

I claim:

1. A disc brake comprising at least one rotatable brake disc mounted on a rotatable member for rotational movement therewith about an axis, and at least one non-rotatable brake disc mounted adjacent the rotatable brake disc, whereby the rotatable member is braked upon frictional engagement of the two said brake discs, an actuating disc mounted beside said brake discs and spaced therefrom by a set of roller bearing means permitting free rotation of the actuating disc and a member adjacent thereto relative to the brake discs, said actuating disc and said adjacent member being normally rotatable with the rotating member, actuating elements including raised surfaces on the facing surfaces of the actuating disc and the member adjacent thereto and rolling elements between and engaging the said facing surfaces of said actuating discs and said member adjacent thereto, means for limiting rotation of the actuating disc relative to the adjacent member to cause separation and thus said braking such that upon limited rotation of said actuating disc, the rolling elements and the raised surfaces engage to urge the actuating disc and the adjacent member apart to urge the brake discs together to brake the rotating member, said limiting means including an annular element movable generally parallel to said axis to engage the side of the actuating disc facing the said adjacent member and acting in a direction to urge the actuating disc away from the said adjacent member whereby rotational movement of the actuating disc is limited relative to said adjacent member.

2. A disc brake according to claim 1, said limiting means including a piston means mounted to frictionally engage the actuating disc to limit rotation thereof relative to said rotating member.

3. A disc brake according to claim 2 wherein said piston means includes a fluid operated piston fixed with respect to the non-rotatable member and moveable against the side of the actuating disc facing the said adjacent member.

4. A disc brake according to claim 2 wherein said piston means includes a manually operated piston fixed with respect to said non-rotatable member and moveable against the side of the actuating disc facing the said adjacent member.

5. A disc brake according to claim 1, said limiting means including a piston engaging said actuating disc to cause said limited rotational movement of the actuating disc relative to the rotatable member to actuate the brake.

6. A disc brake according to claim 5, said piston being fluid operated.

7. A disc brake according to claim 5, said piston being manually operable.

8. A disc brake according to claim 1 including a plurality of rotating discs and a plurality of non-rotating discs, all axially slidable in a wheel of the vehicle, said actuating disc located at one end of said discs and separated therefrom by bearing means permitting rotational movement of the actuating disc relative to the brake discs, and the adjacent member located on the side of the actuating disc opposite from the bearing means, whereby upon rotational movement of the actuating disc relative to the rotating member, the actuating disc is urged toward the brake disc, acting through the bearing means to urge the brake discs together.

9. A disc brake according to claim 8, said limiting means including a fluid operated cylinder and piston unit acting against the side of the actuating disc facing the adjacent member to limit rotational movement of the actuating disc relative to the rotating member.

10. A disc brake according to claim 8, said limiting means including a manually operable member acting against the side of the actuating disc facing the adjacent member to limit rotational movement of the actuating disc.

* * * * *